(12) United States Patent
Pitkethly

(10) Patent No.: US 7,730,440 B2
(45) Date of Patent: *Jun. 1, 2010

(54) CLOCK SIGNAL DISTRIBUTION SYSTEM AND METHOD

(76) Inventor: Scott Pitkethly, 435 Ave. Del Ora, Redwood City, CA (US) 94062

( * ) Notice: Subject to any disclaimer, the term of this patent is extended or adjusted under 35 U.S.C. 154(b) by 236 days.

This patent is subject to a terminal disclaimer.

(21) Appl. No.: 11/171,668

(22) Filed: Jun. 30, 2005

(65) Prior Publication Data

US 2007/0025493 A1    Feb. 1, 2007

(51) Int. Cl.
G06F 17/50    (2006.01)
H03K 3/00     (2006.01)
H01L 21/82    (2006.01)

(52) U.S. Cl. .................. 716/12; 716/13; 438/129; 327/295

(58) Field of Classification Search .......... 716/6, 716/12–13; 438/129; 327/295
See application file for complete search history.

(56) References Cited

U.S. PATENT DOCUMENTS

| | | | |
|---|---|---|---|
| 5,272,600 A | 12/1993 | Carey | |
| 5,416,861 A | 5/1995 | Koh et al. | |
| 5,640,049 A | 6/1997 | Rostoker et al. | |
| 6,400,230 B2 | 6/2002 | Fairbanks | |
| 6,522,186 B2 | 2/2003 | O'Mahony et al. | |
| 6,538,957 B2 | 3/2003 | Magoshi | |
| 6,696,863 B2 | 2/2004 | Yamamoto et al. | |
| 6,711,727 B1 | 3/2004 | Teig et al. | |
| 6,769,104 B2 | 7/2004 | Rodgers et al. | |
| 6,934,924 B2 | 8/2005 | Paul et al. | |
| 6,936,898 B2 | 8/2005 | Pelham et al. | |
| 7,117,470 B1 | 10/2006 | Teig et al. | |
| 7,216,322 B2 | 5/2007 | Lai et al. | |
| 7,217,962 B1 | 5/2007 | Masleid | |
| 2002/0162079 A1 | 10/2002 | Igarashi et al. | |
| 2003/0127241 A1* | 7/2003 | Russell et al. | 174/52.4 |
| 2003/0209766 A1 | 11/2003 | Blanchard | |
| 2004/0044983 A1* | 3/2004 | Dillon et al. | 716/21 |
| 2004/0107412 A1 | 6/2004 | Pack et al. | |
| 2004/0153985 A1 | 8/2004 | Paul et al. | |
| 2004/0210857 A1 | 10/2004 | Srinivasan | |
| 2005/0023705 A1 | 2/2005 | Campbell et al. | |
| 2005/0138593 A1 | 6/2005 | Okumura | |
| 2005/0216877 A1 | 9/2005 | Pack et al. | |
| 2005/0280159 A1 | 12/2005 | Okumura | |
| 2007/0136707 A1* | 6/2007 | Teig et al. | 716/6 |

FOREIGN PATENT DOCUMENTS

| | | |
|---|---|---|
| TW | 95123145 | 4/2007 |
| WO | 2007/005691 | 1/2007 |

OTHER PUBLICATIONS

International Search Report Mail Date Nov. 24, 2006; PCT/US2006/025739; Filed Jun. 29, 2006.

(Continued)

*Primary Examiner*—Stacy A Whitmore

(57) ABSTRACT

A diagonal offset clock signal distribution system and method are presented that facilitate maximized placement of a diagonal offset clock signal distribution tree.

15 Claims, 3 Drawing Sheets

OTHER PUBLICATIONS

International Preliminary Report on Patentability Mail Date Jan. 9, 2008; PCT/US2006/025739; Filed Jun. 29, 2006.
Non-Final Office Action Dated Jul. 24, 2007; U.S. Appl. No. 11/479,616.
Final Office Action Dated Apr. 10, 2008; U.S. Appl. No. 11/479,616.
Notice of Allowance Dated Oct. 27, 2008; U.S. Appl. No. 11/479,616.
Notice of Allowance Dated Feb. 11, 2009; U.S. Appl. No. 11/479,616.
Application As Filed Filing date Jun. 30, 2006; U.S. Appl. No. 11/479,616;.
Ronan Farrell; IC Fabrication Technology; Solid State Electonics.
Etienne Moulin; IC Technology and Failure Mechanisms; Power Line; Jun. 2004.
Nobelprize.Org; The History of the Integrated Circuit; 2009.
Non-Final Office Action Dated Jul. 9, 2009; U.S. Appl. No. 11/274,098.
Final Office Action Dated Mar. 23, 2009; U.S. Appl. No. 11/274,098.
Non-Final Office Action Dated Oct. 07, 2008; U.S. Appl. No. 11/274,098.
Non-Final Office Action Dated Jul. 31, 2009; U.S. Appl. No. 11/477,970.
Advisory Action Dated Jun. 18, 2009; U.S. Appl. No. 11/477,970.
Final Office Action Dated Apr. 10, 2009; U.S. Appl. No. 11/477,970.
Non-Final Office Action Dated Nov. 4, 2008; U.S. Appl. No. 11/477,970.

* cited by examiner

CLOCK SIGNAL DISTRIBUTION SYSTEM AND METHOD

FIELD OF THE INVENTION

The present invention relates to the field of integrated circuit fabrication. More particularly the present invention relates to clock signal distribution in an integrated circuit.

BACKGROUND OF THE INVENTION

Electronic devices and systems have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. These electronic devices often include integrated circuits that perform variety of functions. In numerous implementations, operations performed by the integrated circuits are synchronized by clock signals. However, routing constraints can make clock signal distribution in conventional clock distribution systems a formidable task.

SUMMARY

A diagonal offset clock signal distribution system and method are presented that facilitate maximized placement of a diagonal offset clock signal distribution tree.

DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Reference will now be made in detail to preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention has offset diagonal clock signal distribution path symmetries that facilitate high speed, low clock-skew clock distribution. For example, the present invention offset diagonal distributions ensure endpoints are equidistant from central dock signal sources. Present invention diagonal clock signal distribution routes reduce relative distance from the driver to the endpoint compared to traditional non-diagonal clock signal distribution routes. Embodiments of the present invention also facilitate maximized placement of clock signal distribution routes in a single metal layer (e.g., a top metal layer).

Maximized placement of clock signal routes in a single layer facilitates realization of numerous increased performance advantages. Implementations of the present invention emphasize formation of the clock signal distribution tree in the single layer. A single layer route provides for a more uniform electrical medium (e.g., that is less influenced by process variations between the different layers). Placing clock distribution tree resources in the top metal layer can offer a number of advantages. For example, top metal layer emphasized implementations of the present invention can have one side exposed to air or plastic providing for less overall parasitic capacitance. The present invention offset diagonal clock signal distribution tree also facilitates convenient avoidance of other components included in a metal layer. For example, a present invention offset diagonal clock distribution tree facilitates the avoidance of pads in the top metal layer. Embodiments of the present invention can also enable reduced "doubling back" which can be relatively costly and impractical, especially if pads are conforming to an orthogonal array.

Figure 1:
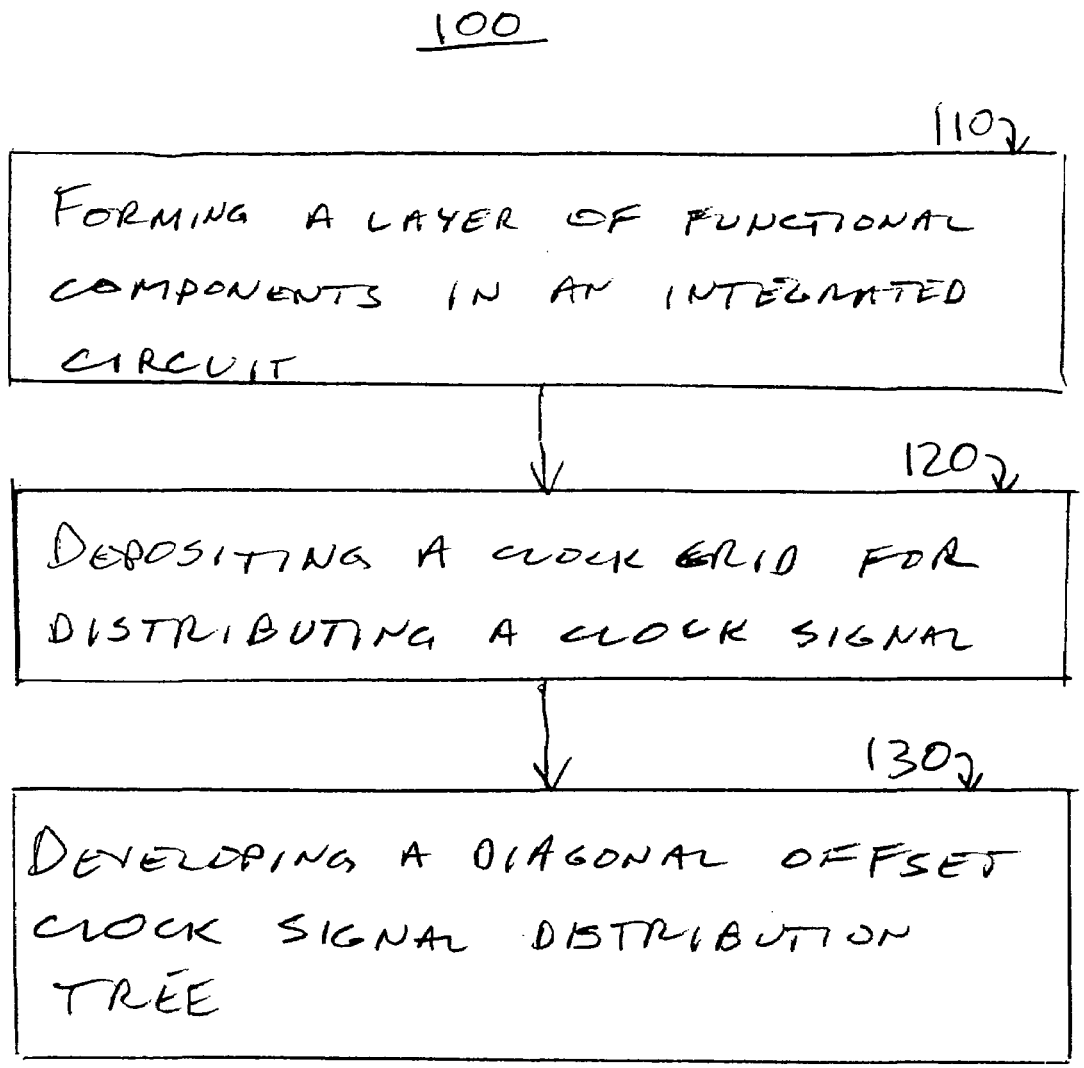
FIG. 1 is a flowchart of an exemplary integrated circuit clock distribution formation method in accordance with one embodiment of the present invention.

FIG. 1 is a flowchart of exemplary integrated circuit clock distribution formation method 100, in accordance with one embodiment of the present invention. Integrated circuit clock distribution formation method 100 facilitates maximized placement of clock signal distribution paths within a single layer. Clock signal distribution formation method 100 also provides a clock signal distribution arrangement in which clock signal delays and/or skews are minimized.

In step 110, a layer of clocked functional components is formed in an integrated circuit. A variety of different types of functional components can be formed in the layer, including synchronized functional components. For example, a number of functional component operations can be triggered or activated by a synchronizing clock signal.

In step 120, a clock grid mesh is deposited. The clock grid mesh distributes a clock signal to the clocked functional components. In one embodiment of the present invention, the clock grid mesh is oriented in either a vertical and/or horizontal orientation. Supplemental routes can be added to the clock grid to provide supplemental routes to adjacent grid lines. For example, supplemental horizontal routes can be added to vertical grid lines. In one exemplary implementation, the supplemental routes provided additional short paths for the clock signal.

In step 130, a diagonal offset clock signal distribution tree for distributing a clock signal to the clock grid is developed. The diagonal offset signal distribution tree provides a plurality of connections to vertical and/or horizontal paths in the clock grid. Opposing intermediate downstream braches of the diagonal offset clock signal distribution tree are offset on an intermediate upstream branch. In one embodiment, the paths form an offset Y distribution path configuration in which paths of the diagonal offset clock signal distribution tree do not come back on one another between two adjacent pads. In one exemplary implementation of the present invention, endpoints of the offset clock grid are equidistant from a central clock source.

In one embodiment of the present invention, development of the diagonal offset clock signal distribution tree is emphasized in a single layer. For example, as much of the diagonal offset clock signal distribution tree as possible is placed within a single layer. In one exemplary implementation, if two paths of the diagonal offset clock signal distribution tree have a routing conflict with one another and/or other components within the single layer the path of the diagonal offset clock signal distribution tree that is closest to the clock source is the path selected for routing to an alternate layer. Selecting the past closest to the clock source helps maintain symmetry in clock distribution paths for the clock signal and minimizes clock skew. For example, thee path closest to the clock source can make metal jumping symmetrical through the clock distribution structure. In one embodiment of the present invention, the diagonal offset clock signal distribution tree is included in a top metal layer of an integrated circuit.

Figure 2A:
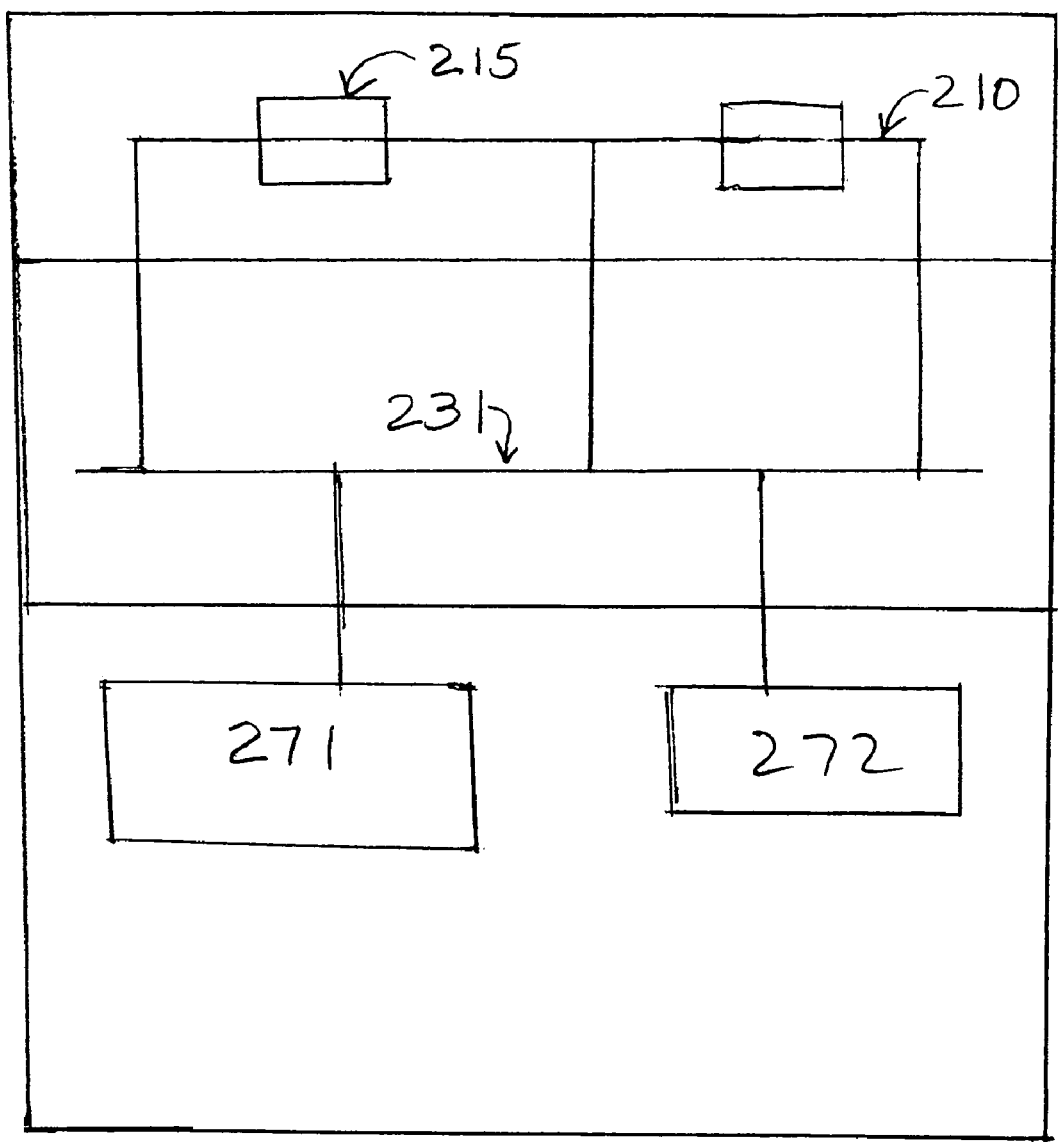
FIG. 2A is a block diagram side view of an exemplary integrated circuit clock signal distribution system in accordance with one embodiment of the present invention.

FIG. 2A is a block diagram side view of exemplary integrated circuit clock signal distribution system 200 in accordance with one embodiment of the present invention. Clock signal distribution system 200 includes a plurality of clocked components 271 and 272, a clock grid mesh 231, and a diagonal offset clock signal distribution tree 210. Clocked components 271 and 272 are communicatively coupled to clock grid mesh 231, which in turn is communicatively coupled to diagonal offset clock signal distribution tree 210. In one embodiment of the present invention, the plurality of clocked components 271 and 272 are formed in a substrate, clock grid mesh 231 is formed in a first layer, and a diagonal offset clock signal distribution tree 210 is formed in a second layer. In one exemplary implementation, diagonal offset clock signal distribution tree 210 is formed in a top metal layer.

The components of integrated clock signal distribution system 200 cooperatively operate to distribute clock signals. Clocked components 271 and 272 can perform a variety of functional operations. Clock grid mesh 231 distributes a clock signal to the clocked components. Diagonal offset clock signal distribution tree 210 distributes a clock signal to the clock grid mesh.

Figure 2B:
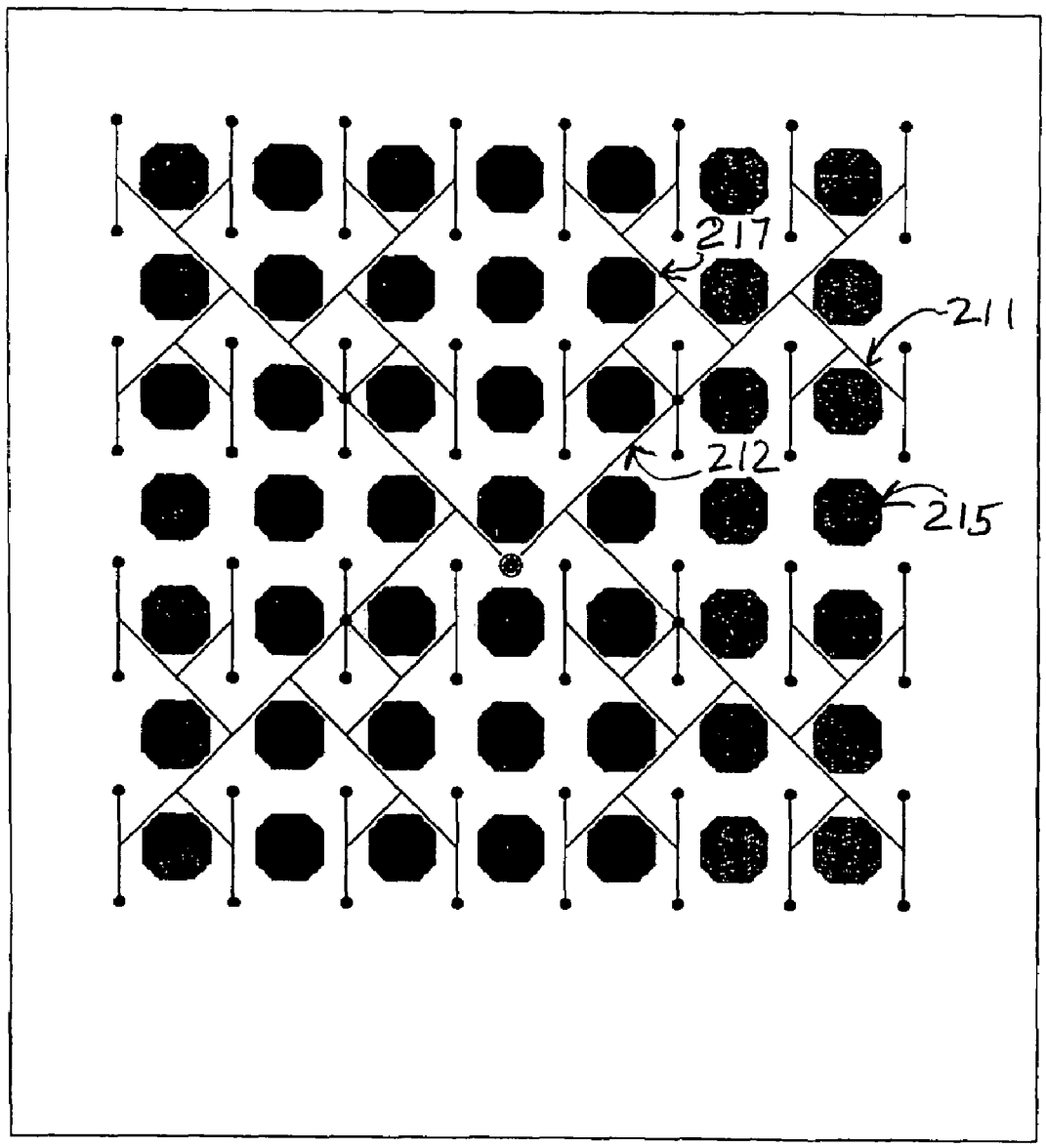
FIG. 2B is a block diagram top view of an exemplary integrated circuit clock signal distribution system in accordance with one embodiment of the present invention.

FIG. 2B is a block diagram top view of exemplary integrated circuit clock signal distribution system 200 in accordance with one embodiment of the present invention. Opposing intermediate downstream branches of the diagonal offset clock signal distribution tree are offset on an intermediate upstream branch. For example, intermediate diagonal downstream branches 211 and 217 of the diagonal offset clock signal distribution tree 210 are offset from one another on intermediate upstream branch 212. Diagonal offset clock signal distribution tree 210 forms a uniform array of end points that deliver clock signals to clock grid 230, wherein endpoints of the diagonal offset clock signal distribution tree are equidistant from a central clock point. In one embodiment, diagonal offset clock signal distribution tree 210 is included in a top metal layer of an integrated circuit.

The offsets in diagonal offset clock signal distribution tree 210 can be arranged (e.g., configured) to avoid other components in the same layer as diagonal offset clock signal distribution tree 210. In one exemplary implementation, integrated circuit clock signal distribution system 200 includes pads 215 for communicatively coupling external components to a power distribution grid (not shown). The offset in the diagonal braches of diagonal offset clock signal distribution tree 210 are wider than the pads permitting the clock signal to be distributed around the pads. In one embodiment, diagonal offset clock signal distribution tree 210 in included in the same layer as a power grid. For example, diagonal offset clock signal distribution tree 210 and the power grid are included in a top metal layer of an integrated circuit. The power distribution grid distributes power to the plurality of clocked components 271 and 272.

In one embodiment of the present invention, photolithography is utilized to form clock signal distribution system. For example, a photolithographic mask template of an offset Y configuration is used to form a diagonal offset clock signal distribution tree.

Thus, the present invention facilitates efficient and effective clock signal distribution while minimizing delays and skews. Present invention diagonal clock signal distribution routes reduce relative distance from the driver to the endpoint compared to traditional non-diagonal clock signal distribution routes. Embodiments of the present invention also facilitate maximized placement of clock signal distribution routes in a single metal layer (e.g., a top metal layer) while providing for a more uniform electrical medium with less overall parasitic capacitance. The present invention offset diagonal clock signal distribution tree also facilitates minimized doubling back in clock distribution paths and convenient avoidance of other components included in a metal layer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An integrated circuit clock distribution system comprising:
   a plurality of clocked components;
   a clock grid mesh for distributing a clock signal to said clocked components; and
   a diagonal offset clock signal distribution tree for distributing a clock signal to said clock grid mesh, wherein said diagonal offset clock signal distribution tree and a power distribution grid are included in a top metal layer of an integrated circuit and opposing intermediate downstream branches of said diagonal offset clock signal distribution tree are offset on an intermediate upstream branch; and
   pads for communicatively coupling external components to said power distribution grid, wherein said offset is wider than said pads.

2. An integrated circuit clock distribution system of claim 1 wherein said diagonal offset clock signal distribution tree forms a uniform array of end points that said clocked components are tapped into.

3. An integrated circuit clock distribution system of claim 1 wherein endpoints of said diagonal offset clock signal distribution tree are symmetrical from a central clock point.

4. An integrated circuit clock distribution system of claim 1 further comprising a ground grid for providing a ground to said plurality of clocked components.

5. An integrated circuit clock distribution formation method:

forming a layer of clocked functional components in an integrated circuit;

depositing a clock grid mesh for distributing a clock signal to said clocked functional components; and developing a diagonal offset clock signal distribution tree for distributing said clock signal to said clock grid mesh, wherein said diagonal offset clock signal distribution tree is in a single layer and opposing intermediate downstream branches of said diagonal offset clock signal distribution tree are offset on an intermediate upstream branch and said offset is wider than a pad.

6. An integrated circuit clock distribution formation method of claim 5 wherein photolithography is utilized to form said diagonal offset clock signal distribution tree.

7. An integrated circuit clock distribution formation method of claim 6 wherein a photolithographic mask template is an offset Y configuration.

8. An integrated circuit clock distribution formation method of claim 6 wherein endpoints of said diagonal offset clock signal distribution tree are equidistant from a central clock source.

9. An integrated circuit clock distribution formation method of claim 6 wherein supplemental routes are added to said clock grid mesh.

10. An integrated circuit clock distribution formation method of claim 6 wherein vertical vias couple endpoints of said diagonal offset clock signal distribution tree in a first layer to said clock grid mesh in a second layer.

11. An integrated circuit clock distribution formation method of claim 6 wherein offset paths in said diagonal offset clock signal distribution tree couple vertical runs in said clock grid mesh.

12. An integrated circuit clock distribution formation method of claim 6 wherein paths of said diagonal offset clock signal distribution tree do not come back on one another between two adjacent pads.

13. An integrated circuit clock distribution formation method of claim 6 wherein said diagonal offset clock signal distribution tree distributes signals in a single clock domain.

14. An integrated circuit clock distribution system comprising:

a means for performing functional operations; and a means for distributing a clock signal, wherein said means includes diagonally offset branches and opposing intermediate downstream branches are offset on an intermediate upstream branch and said offset is wider than a pad, wherein said means for distributing a clock signal includes a diagonal offset clock signal distribution tree in a single layer.

15. An integrated circuit clock distribution system of claim 14 wherein endpoints of said means for distributing said clock signal are symmetrically equidistant from a central clock distribution point.

* * * * *